US006947073B1

(12) United States Patent
Seal

(10) Patent No.: US 6,947,073 B1
(45) Date of Patent: Sep. 20, 2005

(54) APPARATUS AND METHOD FOR DETECTING A MOVING TARGET

(75) Inventor: Clinton D. Seal, Camarillo, CA (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 0 days.

(21) Appl. No.: 10/839,446

(22) Filed: Apr. 27, 2004

Related U.S. Application Data

(63) Continuation-in-part of application No. 09/549,662, filed on Apr. 14, 2000, now abandoned.

(51) Int. Cl.[7] .............................................. H04N 7/18
(52) U.S. Cl. ....................... 348/169; 348/143; 348/161
(58) Field of Search ................................. 348/169, 143, 348/144, 148, 154, 155, 161; 702/152

(56) References Cited

U.S. PATENT DOCUMENTS 5,361,217 A * 11/1994 Makimura et al. .......... 702/152
6,707,487 B1 * 3/2004 Aman et al. ................ 348/169

* cited by examiner

Primary Examiner—Allen Wong
(74) Attorney, Agent, or Firm—Laura R. Foster

(57) ABSTRACT

The present invention relates to an apparatus and a method to detect a moving target. An embodiment of the present invention includes a processor that uses an imaging sensor such as, for example, an electronic camera, and uses images and surveillance system pointing angle information to generate a dynamically changing reference image that is subtracted from the live image, with the result being a moving target.

20 Claims, 4 Drawing Sheets

APPARATUS AND METHOD FOR DETECTING A MOVING TARGET

CROSS-REFERENCE TO RELATED APPLICATION

This application is a continuation-in-part of U.S. patent application Ser. No. 09/549,662, filed Apr. 14, 2000, now abandoned, incorporated herein by reference.

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

BACKGROUND

Electronic surveillance images typically contain a large amount of clutter, or unusable background detail. The clutter is disruptive to the main purpose of surveillance. To reduce clutter, a conventional method calls for subtracting out the non-moving parts of the image. A biological example serves to illustrate the pros and cons of this conventional technique.

Some frogs see moving targets, e.g., flying insects, and eat them when within range. The surveillance system used by these frogs, i.e., the frog's eye and neurological system, has a retina that is so specialized that it sees only moving objects. In fact, experiments have shown that some frogs will starve if provided only motionless insects as a diet. The frog stares in a fixed manner, recognizes targets within the retina's field-of-view (FOV), and attacks when within range. Existing surveillance systems are a lot like frogs.

Conventional unattended surveillance cameras are fixed, much like the frog's stare, such that movement detected within their FOV generates an alarm signal to a remote location for response by appropriate security resources. The method by which movement is detected using a fixed camera(s) relies on the camera(s) remaining still. Even the shaking caused by wind is detrimental to their proper operation, causing false alarms that, if often generated, may lull a security force into delaying the necessary response.

The technique used with these systems correctly identifies the non-moving scene elements and then generates a reference image of them. The reference image is compared to the present live image and, theoretically, any difference in images represents a moving target or intruder when presented in a surveillance system using a fixed camera(s). A common example is the closed circuit video system used to monitor a car dealership's lot when closed. The image of the lot is "cluttered" with parked cars. An image processor subtracts out the parked cars and highlights moving objects such as intruders. To address some of the problems associated with the simple subtraction of fixed images, more elaborate algorithms have been developed, including those associated with the use of "fish-eye" lenses on cameras to provide a broader coverage with a single fixed camera.

Conventional methods used image processing of past and current (live) images and prior knowledge of the scene of interest. Changes in image resolution, geometric distortion, and processing algorithms improved the ability of these systems to output the desired result. Moving target image discriminators (MTIDs) compensated for changes in lighting, ignored slowly changing shadows, etc. Each improvement still required the camera to be locked down (or fixed) or multiple cameras to be used. If a particular requirement was for a large FOV and high-resolution images for discriminating moving targets, the solution was to provide an array of fixed cameras and processors sufficient to cover the volume to be protected. This adds expense and complexity for many applications, in particular those requiring 360° panning and 180° tilt coverage, as is the case in many military tracking applications.

One problem with these systems is that the surveillance camera(s) must still remain fixed and not be permitted to pan, tilt, or even shake in the wind. Panning and tilting causes the entire scene image to shift up, down, right, or left. Image comparisons of consecutive views from a panning or tilting camera that uses simple pixel element by element comparison techniques to provide alerts as to moving objects result in near total image noise, i.e., an unusable result. In fact, if the camera were to move even slightly due to wind or vibration, the resulting image is unusable. Accordingly, there is a need for a surveillance system that covers a large volume with the least number of resources, while also avoiding false alarms caused by wind or vibration (from such as, for example, heavy truck traffic).

SUMMARY OF THE INVENTION

Embodiments of the present invention include an apparatus and a method for detecting moving targets including a processor that uses an imaging sensor such as, for example, an electronic camera, and uses images and surveillance system pointing angle information to generate a dynamically changing reference image that is subtracted from the live image, with the result being a moving target.

An embodiment of the present invention includes an apparatus for detecting a moving target utilizing a Moving Target Image Discriminator (MTID) including an optical tracking system including an image sensor connected to a tracking mount, pointing angle measuring and recording devices coupled to the tracking mount, and a system controller configured to operate the tracking mount so as to keep the target near the center of a field of view (FOV) for the image sensor. The MTID includes means for initiating the image sensor, means for receiving successive live images from the image sensor, means for capturing pointing angle data from the pointing angle measuring and recording devices to describe a position for the image sensor, means for generating successive reference images, each of the successive reference images generated by consecutively shifting a previous reference image by an amount corresponding to a change in the pointing angle data, leaving a gap in the previous reference image, and filling the gap with a slice of the live images corresponding to the change in the pointing angle data, means for subtracting the successive reference images from the successive live images, the subtraction resulting in moving target images, and means for outputting the moving target images, thereby detecting the moving target.

Another embodiment of the present invention includes a method for detecting a moving target utilizing a Moving Target Image Discriminator (MTID) including providing an optical tracking system including an image sensor connected to a tracking mount, pointing angle measuring and recording devices coupled to the tracking mount, and a system controller configured to operate the tracking mount so as to keep the target near the center of a field of view (FOV) for the image sensor, initiating an operation of the image sensor, receiving successive live images from the image sensor, capturing pointing angle data from the pointing angle measuring and recording devices to describe a position of the image sensor, generating successive reference images, each of the successive reference images generated by consecutively shifting a previous reference image by an amount corresponding to a change in the pointing angle data, leaving a gap in the previous reference image, and filling the gap with a slice of the live images corresponding to the change in the pointing angle data, subtracting the successive reference images from the successive live images, to generate moving target images and outputting the moving target images, thereby detecting moving targets.

DETAILED DESCRIPTION

The present invention relates to an apparatus and a method to detect a moving target. An embodiment of the present invention includes a processor that uses an imaging sensor such as, for example, an electronic camera, and uses images and surveillance system pointing angle information to generate a dynamically changing reference image that is subtracted from the live image, with the result being a moving target. Using pointing angle data in addition to live and reference images, the processor detects moving targets even when the sensor is panning, tilting, or otherwise not completely fixed.

In an embodiment of the present invention a surveillance camera generates successive live images. As the camera is panned left or right or tilted up or down, successive images include both fixed and moving objects in the image. As each image is generated, measurements are made of the camera pointing angle. As the camera moves, the live image changes in slices that correspond to the change in the camera pointing angle. The processor builds a synthetic reference image adding these slices one at a time to the field of the image. When the initial reference image is completed, the processor continues to update the reference image in the same manner, and subtracts the current reference image from the current live image, canceling out non-moving clutter, leaving only moving items in the output image. The processor continues to add and remove slices to the reference image corresponding to the movement of the camera, at the image capture rate (e.g., the camera's frame rate), and continues to subtract the most recent reference image from the current live image thereby tracking a moving target.

Optical Tracking System

Figure 1:
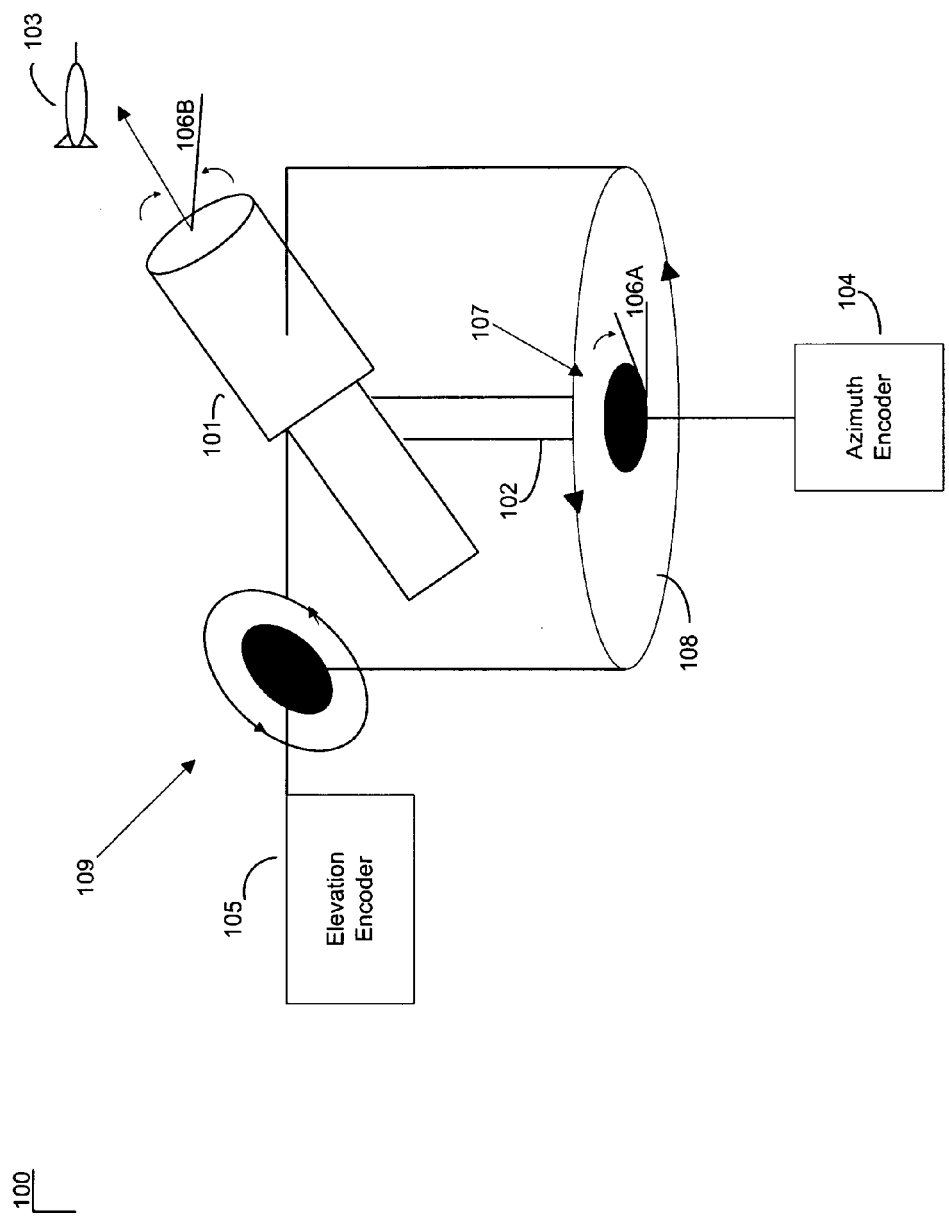
FIG. 1 is a diagram depicting an elevation over azimuth camera tracking mount in an embodiment of the present invention.

According to an embodiment of the present invention, and referring to the drawings, wherein elements are identified by numbers and like elements are identified by like numbers throughout the figures, FIG. 1 depicts an optical tracking system 100 consisting of an image sensor 101, such as a video camera, with appropriate lens (not separately shown). The sensor 101 is mounted on a tracking mount such as an elevation over azimuth pedestal 102 for tracking a moving target 103. There are also pointing angle measurement devices for providing azimuth angle, such as an azimuth angle encoder 104 and an elevation angle encoder 105. As the sensor 101 pans left and right about the vertical axis 108 and up and down about the horizontal axis 109, the azimuth encoder 104 measures and records the pan angle 106A and the elevation encoder 105 measures and records the tilt angle 106B.

The sensor 101 and lens (not separately shown) operates much like the human eye. The sensor 101 provides images of the scene by using a light gathering and focusing lens and an array of light sensitive elements at the lens focal plane (not separately shown) similar to the retina at the back of the eye. In a camera these individual photo-sensors are known as pixel detectors. They are arranged in a plane at the focal point of the lens. At the focal plane a typical camera has approximately 500 elements in the vertical axis and 800 elements in the horizontal axis arranged in rows and columns to provide adequate scene resolution. Resolution of approximately 10 $\mu$radians is required for gathering high resolution Time Space Position Information (TSPI), i.e., targets that are spaced at less than 10 $\mu$radians are seen as a single target.

Pointing angle measurement devices are typically resolvers or, as in FIG. 1, encoders 104 and 105. The encoders provide approximately 19-bit angle resolution resulting in 12 $\mu$radian pointing angle measurement accuracy. This is consistent with the camera and lens combined image resolution of 10 $\mu$radians.

As the pedestal 102 is slewed to the right, for example, a system controller (not separately shown) keeps the target 103 near the center of the sensor's 101 FOV throughout successive views, in turn insuring that the output image (not separately shown in FIG. 1) will include the target 103. For purposes of illustration these successive fields of view are numbered in FIGS. 2A–2C.

Synthesis of the Reference Image

Figure 3:
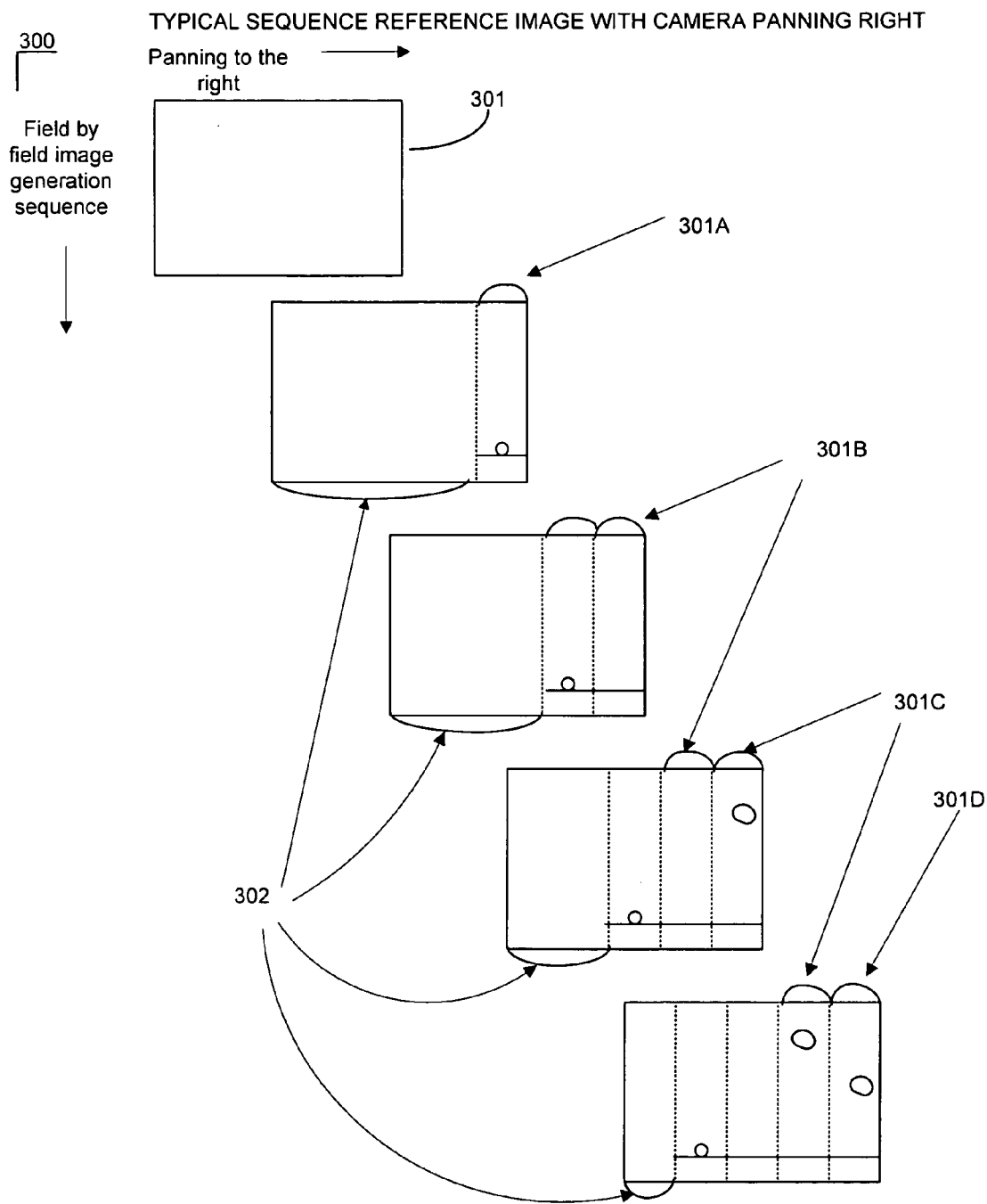
FIG. 3 depicts a sequence illustrating the creation of a reference image with a camera panning to the right in an embodiment of the present invention.

FIG. 3 illustrates an example of the synthesis of a reference image 300 according to an embodiment of the invention utilizing a camera as the imaging sensor. The reference image is composed as the camera initially pans. As the camera moves the live image changes in slices that correspond to the change in the camera pointing angle. The processor builds a synthetic reference image adding these slices one at a time to the initial empty field of the image 301. The reference image is created by successively shifting the previous reference image by the amount corresponding to the change in the camera pointing angle. This leaves a gap 301A–D on the right hand side of the reference image 300 as the camera pans. The gap 301A–D is filled in by the new pixel information in the corresponding slice of the live image (not shown). The portion of the reference image retained 302 from the start of scanning is reduced as the camera continues to pan to the right across its FOV.

When the initial reference is completed it continues to be updated slice by slice and is compared to the live image in order to detect a moving target, as described below.

Target Detection

Figure 2A:
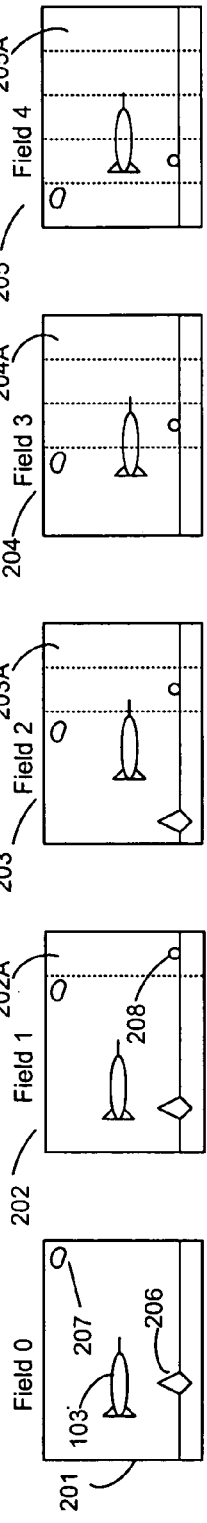
FIGS. 2A–2C are field-by-field pictoral examples of live camera, reference, and MTID output images of a moving target as used in an embodiment of the present invention.
Figure 2B:
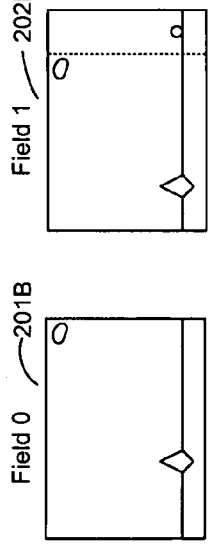
Figure 2C:
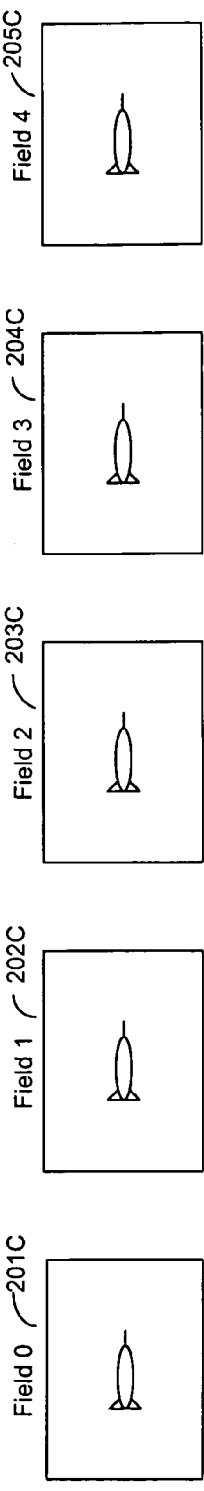

FIGS. 2A–C illustrate examples of successive live images, reference images, and MTID output images according to embodiments of the present invention. These examples refer to an imaging sensor (camera) panning to the right for illustrative purposes only; in other embodiments of the invention the imaging sensor may pan or tilt in additional directions.

Referring to FIG. 2A, five successive live image fields 200 are shown, generated as the camera 101 pans horizontally to keep the target centered in the camera's FOV. In the first image field, Field 0, 201, a cloud 207 and a diamond 206 are fixed or nonmoving objects (representing clutter) and the field is centered on a target 103. The second image field, Field 1, 202, shows a fixed circle 208 entering the FOV from the right side as the camera pans right. Field 2, 203, shows the three fixed objects, 206–208, further shifted left in the image as the camera 101 remains centered on the target 103 as the camera 101 continues to pan right. As the camera 101 pans to track the target 103 the diamond 206 exits from the image at Field 3, 204, and the cloud 207, having started on the right side of Field 0, 201, is about to exit the image on the left side of Field 4, 205. As the camera pans to the right the live image shifts in slices 202A–205A that correspond to the change in the camera pointing angle from field to field.

Referring to FIG. 2B, five successive reference images are shown. The reference image 210 is generated as discussed above by shifting the previous reference by the amount corresponding to the change in the camera's pointing angle as the camera pans, keeping the target in its FOV. The initial completed reference image 201B will be shifted left as the camera pans. A slice of the live image 202A–205A is used to fill in the "gap" created by the shift left, thereby creating reference images 202B–205B. Since the target 103 is moving and did not enter the scene from the right, i.e., the direction in which the camera 101 is panning, the target 103 is not made part of the reference image 210.

Referring to FIG. 2C, the MTID output image 220, i.e., the live image 200 minus the reference image 210, leaves only the moving object(s), i.e., the target 103, centered in each of Fields 0–4, 201C–205C.

Figure 4:
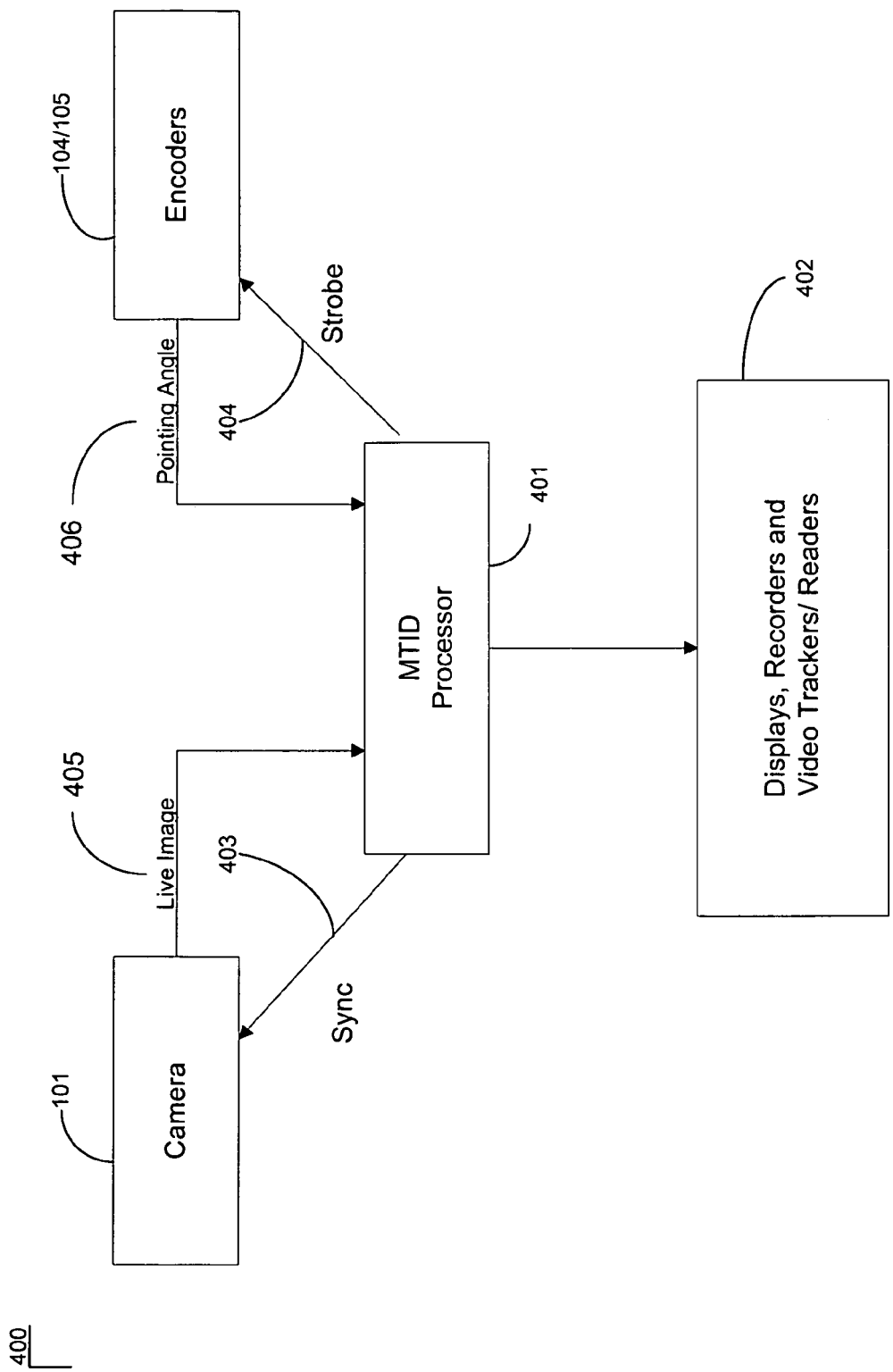
FIG. 4 is a signal flow block diagram of an embodiment of the present invention.

FIG. 4 illustrates a signal flow block diagram 400 for embodiments of the present invention. At the sensor's 101 image capture rate (such as, for example the frame rate of a camera), the MTID processor 401 synthesizes a reference image 210 by shifting the previous reference image by the amount that the sensor 101 has panned and/or tilted. The MTID processor 401 adds a slice of new pixel information to the updated reference image 210 from the live image 200 as described above. The MTID processor 401 then subtracts the new reference image 210 from the live image 200. The output of the MTID processor 401 includes only the moving target image 103, i.e., the scene elements that are moving with respect to the fixed or nonmoving objects of the background (clutter).

Consecutive live or recorded images 200 provided by the sensor 101 are input to the MTID processor together with the very accurate pointing angle data from the encoders 104 and 105. This image and pointing angle data is processed together with the most recent previous image and pointing data to yield an updated field by field (frame-by-frame for a camera) reference image 210 and 201B–205B. The updated reference image 210 and 201B–205B is then subtracted field by field (frame-by-frame for a camera) from the live or recorded image 210 and 201–205 provided by the sensor 101 for generation of an MTID image 220 field by field (frame-by-frame for a camera). This generated MTID image 220 is outputted to various devices such as, for example, displays, recorders, and/or video trackers/readers 402 as required by the end user.

MTID Processor

The sensor 101 receives a synchronization signal 403 from the MTID processor(s) to begin imaging. This is similar to pushing the button to open the shutter on a camera, for example. The sensor 101 is configured to produce an image with an exposure time that is short compared to the image capture rate of a typical sensor, a video camera for example. For a camera, typically 1/500th of a second shutter speeds are used. At the end of the exposure time, the camera's shutter (not separately shown) closes and the live image 405 is sent to the MTID processor 401. This image comprises rows and columns of pixels, also termed scene elements, in a matrix. Each pixel subtends a very small portion of the camera's FOV, serving much the same function as the individual rods and cones within the human eye. Simultaneously, the encoders 104, 105 are sent a strobe signal 404, causing the encoders to send angle pointing data 406 to the MTID processor 401, as is well known in the art.

The MTID processor 401 has stored in memory the immediately previous image field (frame for a camera) and pointing angle data. The difference in pointing angle (a solid angle) is calculated and the MTID processor 401 generates a new reference image by shifting the previous reference image in the appropriate direction opposite the scanning direction in azimuth and elevation (as illustrated in FIG. 2B, 201B–205B). The number of pixels shifted corresponds to the angular shift in pointing angle measured by the panning and tilting axes encoders 104 and 105. The spatial shifting of pixels is possible because the solid pointing angle, comprising azimuth (pan) angle 106A and elevation (tilt) angle 106B, is measured and recorded at high resolution to correlate to the image capture rate of the sensor 101. The gap in pixels left in the reference image frame (either at the top or bottom and possibly left or right) is addressed by the MTID processor 401 by filling in the gap area using pixels from the corresponding area of the live image (as illustrated in FIG. 2A, 202A–205A), thereby creating a new reference image.

The MTID processor 401 then subtracts the reference image 210 from the current live image 200, and outputs an MTID image 220 to outputted to various devices such as, for example, displays, recorders, and/or video trackers/readers 402 as required.

By providing an operator or tracking device images of only moving objects, the tracking or surveillance function is greatly enhanced and simplified. This permits much more simplified display equipment as well as operators who do not require as much training or experience to fully function in the position (when an operator is required). This saves capital equipment, as well as training and maintenance, costs. Further, an embodiment of the present invention may be used in simulators that will cost less and provide more accurate and easily interpreted data for training and updating operators and maintenance technicians.

The MTID of an embodiment of the present invention may be used in a wide variety of surveillance systems. Sensors such as, for example, optical devices operating in the visible, ultraviolet (UV) and infrared (IR) spectrum, including night vision optics, theodolite systems, and active lasers, and even sensors operating at lower frequencies (longer wavelengths), including sonar and radar, can benefit from this technology. Further, these systems can be mechanically, manually, electro-mechanically, electrically, electro-optically, or electronically scanned. Those of ordinary skill in the art will recognize that embodiments of the present invention also lends itself to active surveillance devices including those represented by the class of radar, sonar, laser (including LADAR), and active optical, emitters.

Although the description above contains much specificity, this should not be construed as limiting the scope of the invention but as merely providing an illustration of the presently preferred embodiment of the invention. Thus the scope of this invention should be determined by the appended claims and their legal equivalents.

I claim:

1. An apparatus for detecting a moving target utilizing a Moving Target Image Discriminator (MTID) comprising:
   an optical tracking system comprising:
   an image sensor connected to a tracking mount;
   pointing angle measuring and recording devices coupled to said tracking mount; and
   a system controller configured to operate said tracking mount so as to keep said target near the center of a field of view (FOV) for said image sensor;
   said MTID including:
   means for initiating said image sensor;
   means for receiving successive live images from said image sensor;
   means for capturing pointing angle data from said pointing angle measuring and recording devices to describe a position for said image sensor;
   means for generating successive reference images, each of said successive reference images generated by consecutively shifting a previous reference image by an amount corresponding to a change in said pointing angle data, leaving a gap in said previous reference image, and filling said gap with a slice of the live images corresponding to the change in said pointing angle data;
   means for subtracting said successive reference images from said successive live images, said subtraction resulting in moving target images; and
   means for outputting said moving target images, thereby detecting said moving target.

2. The apparatus of claim 1, wherein said pointing angle measuring and recording devices further comprise an azimuth angle encoder that measures and records a pan angle, and an elevation angle encoder that measures and records a tilt angle.

3. The apparatus of claim 2, wherein said azimuth angle encoder and said elevation angle encoder provide approximately 19-bit angle resolution resulting in 12 $\mu$radian pointing angle measurement accuracy.

4. The apparatus of claim 1, wherein said image sensor is configured to produce images with an exposure time that is short compared to an image capture rate for said image sensor.

5. The apparatus of claim 1, wherein an output from said output means is utilized in displays, recorders, video trackers, or video readers.

6. The apparatus of claim 1, wherein said pointing angle data comprises azimuth and elevation for said image sensor.

7. The apparatus of claim 1 wherein said image sensor comprises a video camera.

8. The apparatus of claim 1 wherein said image sensor comprises a radar having an antenna permitted to scan in azimuth and elevation, said antenna selected from the group consisting of: an antenna that is electro-mechanically scanned, an antenna that is electronically scanned, and an antenna that is manually scanned.

9. The apparatus of claim 1 wherein said image sensor comprises a sonar system capable of tracking in azimuth and elevation.

10. The apparatus of claim 1 wherein said image sensor comprises a theodolite system capable of tracking in azimuth and elevation.

11. A method for detecting a moving target utilizing a Moving Target Image Discriminator (MTID) comprising:
    providing an optical tracking system comprising:
    an image sensor connected to a tracking mount;
    pointing angle measuring and recording devices coupled to said tracking mount; and
    a system controller configured to operate said tracking mount so as to keep said target near the center of a field of view (FOV) for said image sensor;
    initiating an operation of said image sensor;
    receiving successive live images from said image sensor;
    capturing pointing angle data from said pointing angle measuring and recording devices to describe a position of said image sensor;
    generating successive reference images, each of said successive reference images generated by consecutively shifting a previous reference image by an amount corresponding to a change in said pointing angle data, leaving a gap in said previous reference image, and filling said gap with a slice of the live images corresponding to the change in said pointing angle data;
    subtracting said successive reference images from said successive live images, to generate moving target images; and
    outputting said moving target images, thereby detecting moving targets.

12. The method of claim 11, said pointing angle measuring and recording devices further comprise an azimuth angle encoder that measures and records a pan angle, and an elevation angle encoder that measures and records a tilt angle.

13. The method of claim 12, wherein said azimuth angle encoder and said elevation angle encoder provide approximately 19-bit angle resolution resulting in 12 $\mu$radian pointing angle measurement accuracy.

14. The method of claim 11, wherein said sensor is configured to produce images with an exposure time that is short compared to the image capture rate of the sensor.

15. The method of claim 11, further comprising outputting said moving target images to utilize said moving target images in displays, recorders, video trackers, or video readers.

16. The method of claim 11, said pointing angle data comprises said azimuth and elevation for said image sensor.

17. The method of claim 11 wherein said image sensor comprises a video camera.

18. The method of claim 11 wherein said image sensor comprises a radar having an antenna permitted to scan in azimuth and elevation, said antenna selected from the group consisting of: an antenna that is electro-mechanically scanned, an antenna that is electronically scanned, and an antenna that is manually scanned.

19. The method of claim 11 wherein said image sensor comprises a sonar system capable of tracking in azimuth and elevation.

20. The method of claim 11 wherein said image sensor comprises a theodolite system capable of tracking in azimuth and elevation.

* * * * *